United States Patent [19]

Nestler et al.

[11] Patent Number: 5,040,567
[45] Date of Patent: Aug. 20, 1991

[54] MULTI-WAY VALVE

[75] Inventors: Volker Nestler, Niedernhall; Peter Tillman, Neuenstein, both of Fed. Rep. of Germany

[73] Assignee: Burkert GmbH & Company Werk Ingelfingen, Ingelfingen, Fed. Rep. of Germany

[21] Appl. No.: 391,574
[22] PCT Filed: Nov. 17, 1988
[86] PCT No.: PCT/DE88/00720
§ 371 Date: Jul. 17, 1989
§ 102(e) Date: Jul. 17, 1989
[87] PCT Pub. No.: WO89/04935
PCT Pub. Date: Jun. 1, 1989

[30] Foreign Application Priority Data
Nov. 17, 1987 [DE] Fed. Rep. of Germany ....... 3739048

[51] Int. Cl.5 .................... F16K 11/18; F16K 31/02; F16K 31/06
[52] U.S. Cl. ................. 137/625.44; 60/529; 137/870; 257/11; 257/129.16; 257/129.2; 335/274; 335/276
[58] Field of Search ........... 137/596.17, 625.4, 625.44, 137/625.65, 861, 870; 251/11, 75, 129.16, 129.17, 129.2; 335/275, 276, 274; 60/528, 529

[56] References Cited

U.S. PATENT DOCUMENTS

| | | | |
|---|---|---|---|
| 2,562,631 | 7/1951 | Morrison . | |
| 3,263,693 | 8/1966 | Ages | 137/625.65 |
| 3,470,911 | 10/1969 | Dunn | 137/625.65 |
| 3,613,732 | 10/1971 | Wilson et al. | 251/11 |
| 3,683,962 | 8/1972 | Good | 137/870 |
| 3,991,788 | 11/1976 | Kull | 137/870 |
| 4,249,457 | 2/1981 | Sakakibara | 137/625.65 |
| 4,250,924 | 2/1981 | Sakakibara et al. | 137/596.17 |
| 4,446,889 | 5/1984 | Sakakibara et al. | 251/129.16 |
| 4,527,590 | 7/1985 | Kolze | 137/596.17 |
| 4,535,810 | 8/1985 | Duder et al. | 137/625.65 |
| 4,685,652 | 8/1987 | Shopsky | 60/529 |
| 4,905,962 | 3/1990 | Iljin | 251/129.16 |

FOREIGN PATENT DOCUMENTS

| | | | |
|---|---|---|---|
| 3018951 | 11/1981 | Fed. Rep. of Germany | 251/129.16 |
| 853822 | 12/1940 | France | 137/625.65 |
| 2091196 | 1/1972 | France . | |
| 2550602 | 2/1985 | France . | |

Primary Examiner—George L. Walton
Attorney, Agent, or Firm—Sixbey, Friedman, Leedom & Ferguson

[57] ABSTRACT

The multi-way valve comprises two valve seats (12, 14) formed in the valve chamber whose seat surfaces are parallel. Two closing bodies (22, 24) cooperating with one of these valve seats (12, 14) respectively are attached to both ends of an elongated actuating member (20). To this actuating member (20) there is attached the one end of an elastic lamella (18) whose other end (18A) is braced at the valve chamber (10). The actuating member (20) may swivel rocker-like around a swivel axis (28) which is not fixed in space. Although no direct guide for the actuating member (20) is provided, a precise guiding largely free from tolerances is guaranteed so that the drive power required is low.

31 Claims, 6 Drawing Sheets

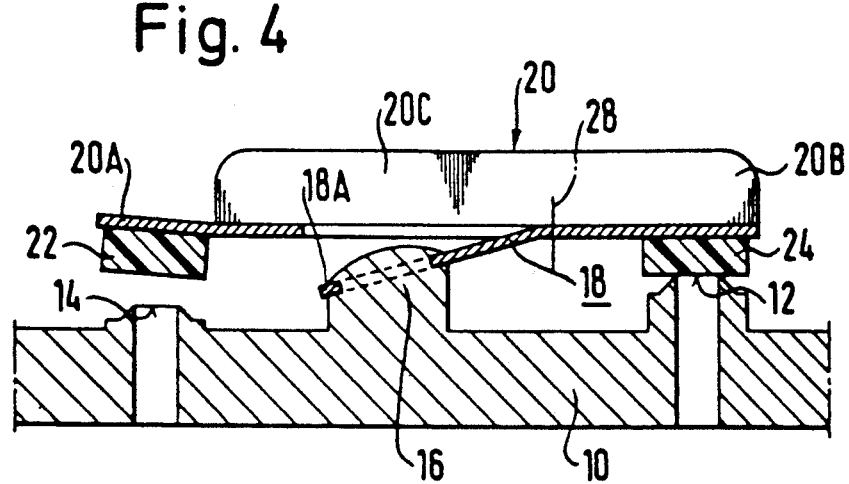
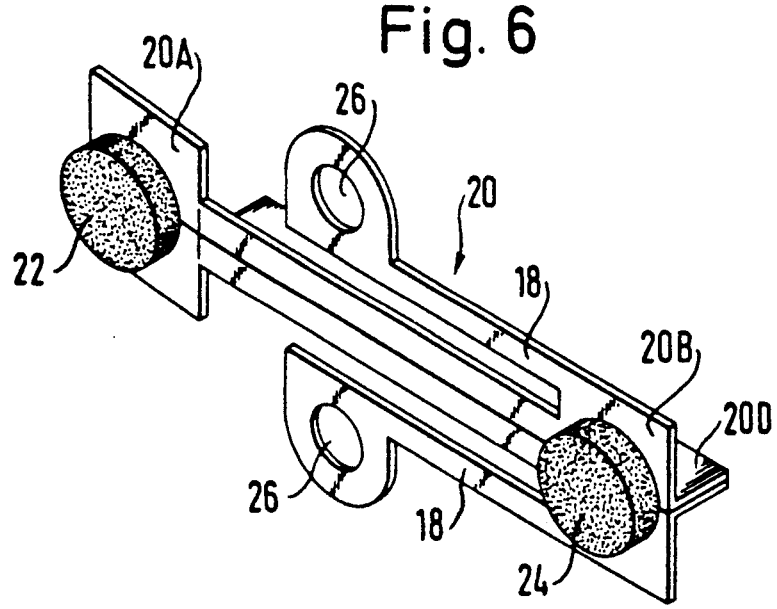
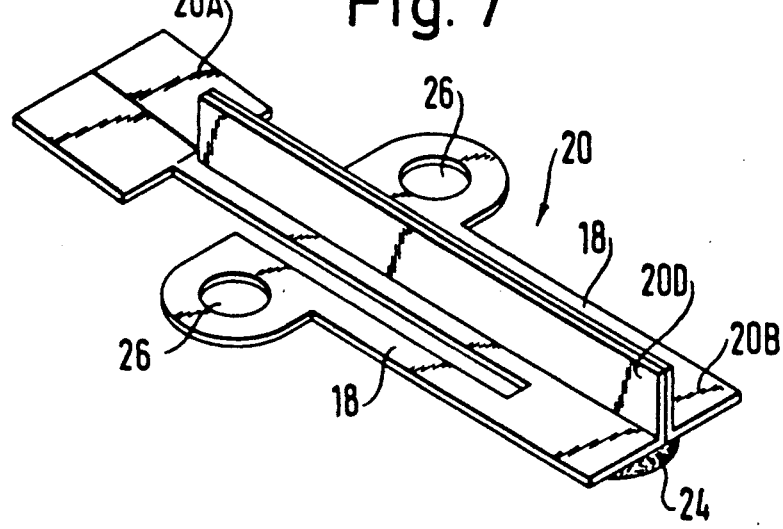

MULTI-WAY VALVE

The present invention relates to a multi-way valve comprising two valve seats formed in the valve chamber whose seat surfaces are coplanar or parallel displaced with respect to each other, two closing bodies cooperating with each of the valve seats respectively, the closing bodies being movable in the same direction between closing position and opening position, an elongated actuating member whose ends the closing bodies are attached to, and a drive engaging the actuating member.

Such multi-way valves have been known in numerous designs. Generally, one tries to attain a compact design, low weight, low manufacturing costs as well as low drive power. However, these requirements contradict each other. For instance, if relatively high manufacturing tolerances are accepted in the interest of low production costs, a higher driving power is needed to take into account the increased stroke due to the tolerances or to match inexact guiding of the closing body with respect to its seat surface due to increased pressure forces. If a transmission element such as a rocker or a transmission lever is utilized in the transmission path between the drive and the actuating member, additional undefined friction occurs depending on dirt and the medium which has to be surmounted by the drive.

It is the underlying object of the invention to provide a multi-way valve of the kind specified above whose distinguishing features include a compact design, a minimum amount of components and easy producibility and low driving power requirement.

This object is met in accordance with the invention in the multi-way valve according to the preamble of claim 1 in that at least one elastic lamella is connected to the actuating member being movable freely and without direct guide, said lamella being firmly gripped at its end looking away from the actuating member and, in the region of its end adjoining the actuating member, forming a swivel mount for the actuating member with a swivel axis being translationally movable in space and around which the actuating member may swivel rocker-like between opening and closing position. This configuration of the multi-way valve according to the invention has made it possible to meet all the self-contradicting requirements with respect to the multi-way valve simultaneously. The valve seats formed at the valve chamber may be removed from the mould by means of a single mould core so that their position relative to each other is almost free from tolerances. The actuating member together with the associated elastic lamella only allows a rocker-like swivelling motion for alternately opening and closing the two valve seats. Motions transverse with regard to the swivelling plane and in the longitudinal direction of the actuating member are prevented both by the firm gripping of the elastic lamella at the valve chamber and the high dimensional rigidity of both the actuating member and the elastic lamella in the corresponding directions. Although there is not provided a direct guide of the actuating member and the closing bodies, it is always in the same relative position with respect to the valve seats that the latter attain parallel contact with the corresponding seat surface so that a minimum contact pressure between closing bodies and seat surfaces being substantially determined by the medium to be switched is sufficient. Transmission elements between the drive and the actuating member may be left out so that corresponding friction losses are avoided. The opening stroke of the closing bodies only shows low tolerances in mass production which need not be especially taken into account in dimensioning the drive. As the actuating member and the lamella may be manufactured in a single piece, the number of components needed is reduced to two elements only, apart from the drive, that is, the valve chamber with integrally formed valve seats and the single-piece actuating member having an elastic lamella as well as the closing bodies attached to the ends of the actuating member. Assembly is extremely easy as it is only the free end of the lamella that has to be fixed at the valve chamber.

Numerous further improvements of the inventive idea as explained above form part of the invention. These improvements are specified in the subclaims. Those embodiments are particularly advantageous in which the actuating member is formed to be rigid at least through the greater part of its length so that the deformation necessary for the rocker-like swivelling motion almost exclusively occurs in the region of the elastic lamella. In this rocker-like swivelling motion there occurs a complex deformation of the elastic lamella and a motion of the actuating member which may only be theoretically predicted under great expenditure. However, if the elastic deformation mainly occurs in the region of the elastic lamella, the motional path of the actuating member may be calculated in advance so that it is guaranteed that the surface of the closing bodies contacts the corresponding seat surface in parallel respectively.

Those embodiments have to be emphasized in particular where rigidity of the actuating member is caused by means of a longitudinally extending region which is integrally formed and bent at right angles and situated on the lateral edges or in form of a middle rib. Both the elastic lamella and the actuating member may be punched from one metal sheet which comprises the elasticity values desired for the lamella because deformation is largely avoided in the region of the integrally formed portion.

Further, those embodiments are particulary advantageous where one of the two closing bodies is applied against the corresponding seat surface through the spring force exerted by the elastic lamella. Accordingly, the corresponding valve seat is closed in driveless condition. It is preferred that the drive engage the actuating member while exerting pressure for opening this valve seat and closing the other valve seat, whereby a pressure force is applied in the direction of the closing motion and to a location of the actuating member in the vicinity of the corresponding closing body. Thus, no form-fit nor frictional connection between the drive and the actuating member is required in non-actuated condition.

Since the multi-way valve according to the invention requires very low driving power, the drive may be dimensioned to be correspondingly small. In particular, it is possible to combine this drive with the actuating member or the elastic lamella, respectively. One embodiment is especially advantageous wherein a bimetallic strip, a strip made of piezoelectric material or a strip to be deformed in dependence upon temperature is combined with the elastic lamella. No additional space is required to house such a drive so that extremely compact multi-way valves ma be created.

Further advantages and features of the invention will become apparent from the following description of several embodiments of the invention and from the drawing which is referred to. In the drawing FIG. 1 is a schematic sectional view of the functional parts of a first embodiment of the multi-way valve in non-driven condition;

FIG. 4 is an analogous view with respect to FIG. 1, however showing the functional parts in actuated position;

FIG. 6 and 7 are two perspective views of a further embodiment of the actuating member taken from two different directions;

Figure 1:
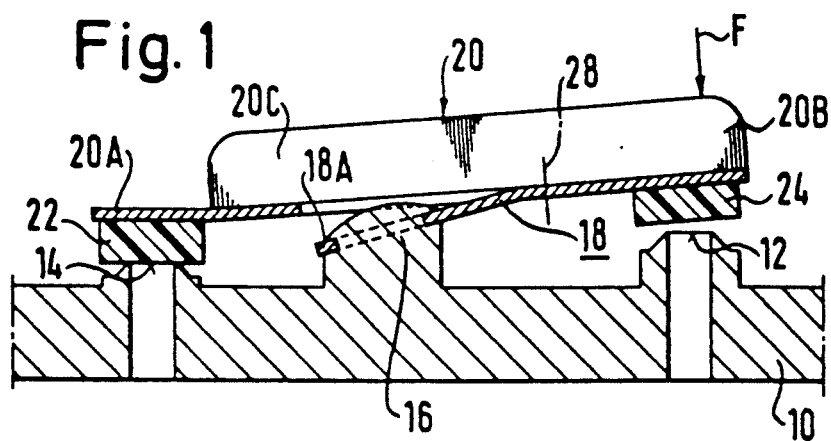

Only the bottom of valve chamber 10 is shown in FIG. 1. Two valve seats 12, 14 are formed to be integral with the bottom of valve chamber 10. The seat surfaces of these valve seats 12, 14 are parallel with respect to each other and mounted at same or slightly different level. A pin-shaped projection 16 is integrally formed to the bottom surface of valve chamber 10. The free end 18A of an elastic lamella 18A is fixed in this projection 16. As can be seen especially clearly from FIGS. 2 and 3, the elastic lamella 18 adjoins the one end region of an actuating member 20 with its other end 18B, the member being formed to be elongate and to have a substantially U-shaped profile and carrying one closing body 22, 24 at both of its respective ends. End region 20A which closing body 22 is attached to forms a lamella-like, slightly offset extension. Between this end region 20A and the other end region 20B which is located in the vicinity of closing body 24, actuating member 20 is substantially rigid and may not be deformed under forces occurring during operation due to the lateral U-shaped profile portions being integrally formed and bent. A circular aperture 26 which facilitates a form-fit connection is formed in the end region 18A for fixing end 18A of elastic lamella 18 at the pin-shaped projection 16. As can be seen from FIG. 1, elastic lamella 18 is sligthly inclined from the plane of actuating member 20 towards its fixing location at projection 16. Elastic lamella 18 is suitably prestressed for holding closing body 22 in contact with the seat surface of valve seat 14 in the condition as shown in FIG. 1. The prestress force of the spring formed by elastic lamella 18 is dimensioned so as to press closing body 22 against the associated seat surface with the required force so that tightness is guaranteed at the medium pressures to be switched. Thus, if an actuating force F (FIG. 1) is exerted to the end region 20B of actuating member 20, actuating member 20 reaches the position shown in FIG. 4. For this, it carries out a rocker-like swivelling motion around an imaginary swivelling axis 28. This swivelling axis 28 which is materially non-existent is not fixed in space, but is slightly transferred translationally when actuating member 20 is swivelled. The precise motional path of swivelling axis 28 can almost not be described in mathematical terms and depends on the elasticity and form of elastic lamella 18 as well as of the transition region between the lamella and actuating member 20 assumed to be rigid. However, there may occur a certain elastic deformation in the region of actuating member 20, too, in its lamella-shaped, slightly bent end region 20A, in particular. Closing body 24 reaches tight contact at the associated seat surface of valve seat 12 under action of actuating force F. At the same time, closing body 22 is lifted off the seat surface of valve seat 14 by the rocker-like swivelling motion of actuating member 20. The bending angle of the lamella-shaped end region 20A and the parallel displacement of the sealing surfaces of both valve seats 12 and 14 are dimensioned so that closing bodies 22, 24 respectively contact the associated seat surface to be parallel. Therefore varying deformations of closing bodies 22, 24 are avoided, which contributes to keeping stroke tolerances low.

Figure 2:
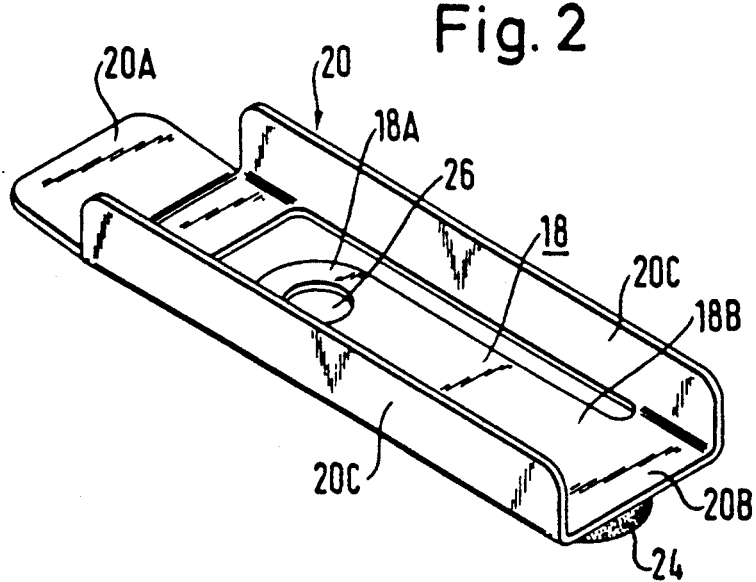
FIG. 2 is a perspective view of an actuating member for the embodiment shown in FIG. 1
Figure 3:
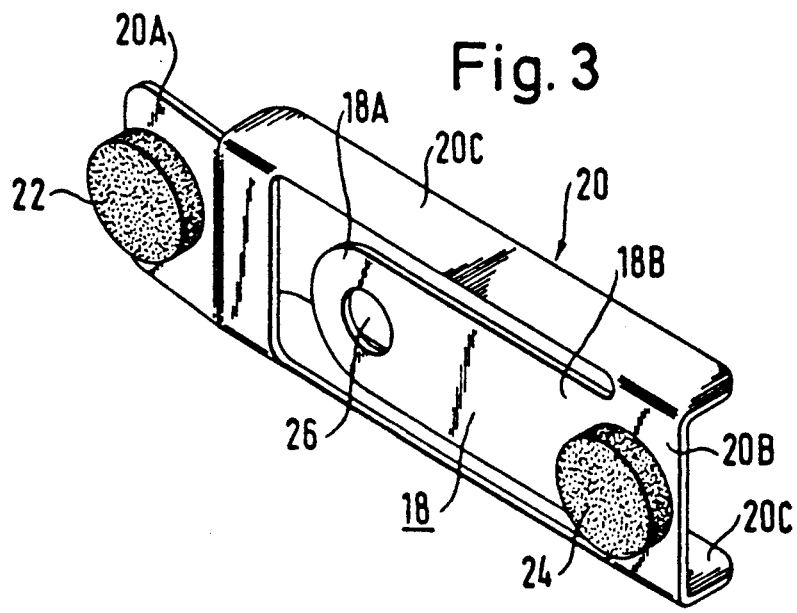
FIG. 3 is another perspective view of the same actuating member.

It is immediately apparent from FIGS. 2 and 3 that actuating member 20 together with elastic lamella 18 may be punched from the same flat material, that is sheet metal, in particular. After elastic lamella 18 and the lamella-shaped end region 20A have been punched out, the lateral edges 20C are bent at right angles. After that, closing bodies 22, 24 are attached to both ends of actuating member 20 in a conventional manner. End 18A of elastic lamella 18 is attached at projection 16 by rivet-like pressing or integral forming or by screw-fitting for gripping actuating member 20 at the valve chamber 10.

Two elastic lamellas 18 which extend from the end region 20B of actuating member 20 to be laterally spaced from the longitudinal sides of actuating member 20 are provided in the embodiment according to FIGS. 6 and 7. The rigidity of actuating member 20 between its end regions 20A and 20B is achieved by means of a middle longitudinal rib 20D which is formed by bending just as in the embodiment according to FIGS. 1 to 4. Actuating member 20 and the elastic lamellas are formed in a single piece in this embodiment, too; however they are formed of two punched parts which are laterally joined and bent at right angles. Further, in this embodiment, the bottom of valve chamber 10 is provided with two projections of the kind shown in FIGS. 1 to 4 (projection 16) for gripping both elastic lamellas 18 at the valve chamber. This double gripping results in especially precise guiding of actuating member 20, because torsion around the longitudinal axis is prevented, in particular.

Figure 8:
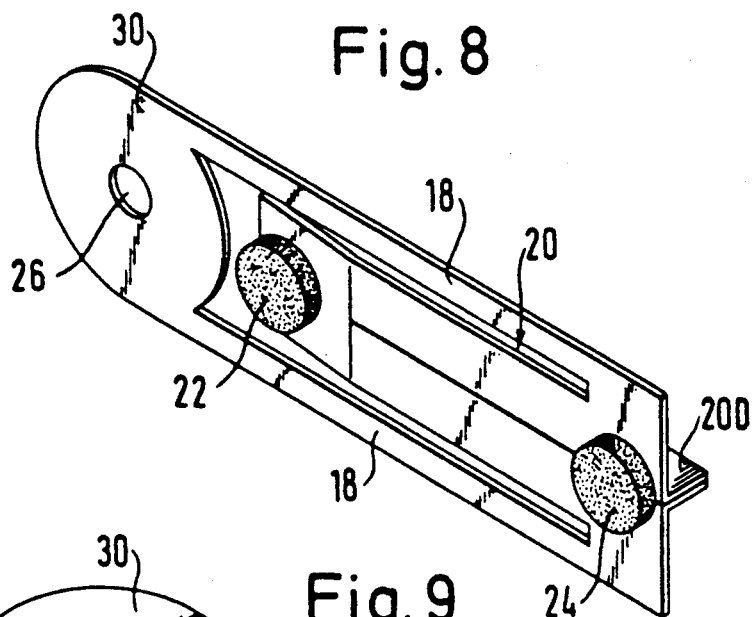
FIG. 8 and 9 are perspective views of a further embodiment of the actuating member taken from different directions.
Figure 9:
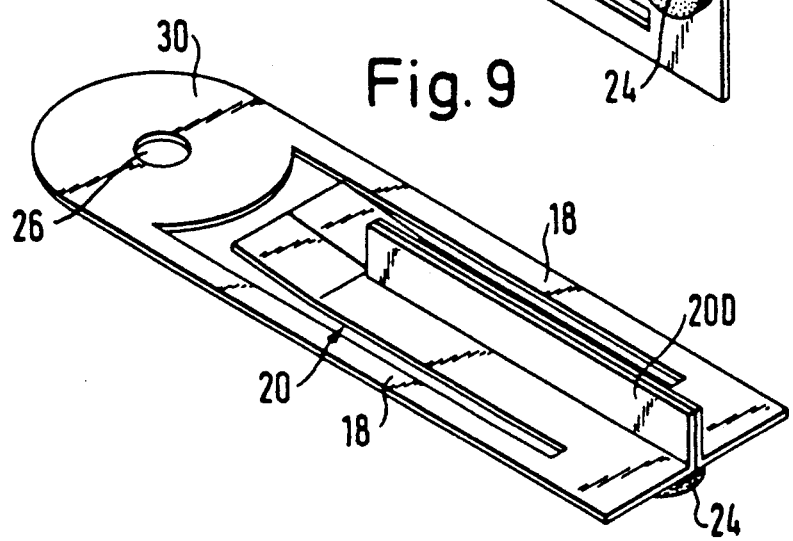

There are also two laterally disposed elastic lamellas 18 in the embodiment shown in FIGS. 8 and 9. These lamellas 18 constitute the longitudinal sides of a rectangular frame surrounding actuating member 20. This actuating member 20 is of similar shape as the one in the embodiment according to FIGS. 6 and 7 and therefore is not described anew. While, in the hitherto described embodiments, the fixing location of elastic lamella 18 is situated between the two valve seats 12, 14, the fixing location is formed at a lateral extension 30 of the rectangular frame whose longitudinal sides constitute elastic lamellas 18. This extension 30 comprises an aperture 26 situated on the same longitudinal axis as closing bodies 22, 24, but which is not situated between these, but on the side of closing body 22 which looks away from closing body 24. Elastic lamellas 18 comprise a comparatively great length in this embodiment as they extend up to the end region of actuating member 20 in the vicinity of closing body 24. Relatively long switching strokes are made possible by this embodiment.

Figure 5:
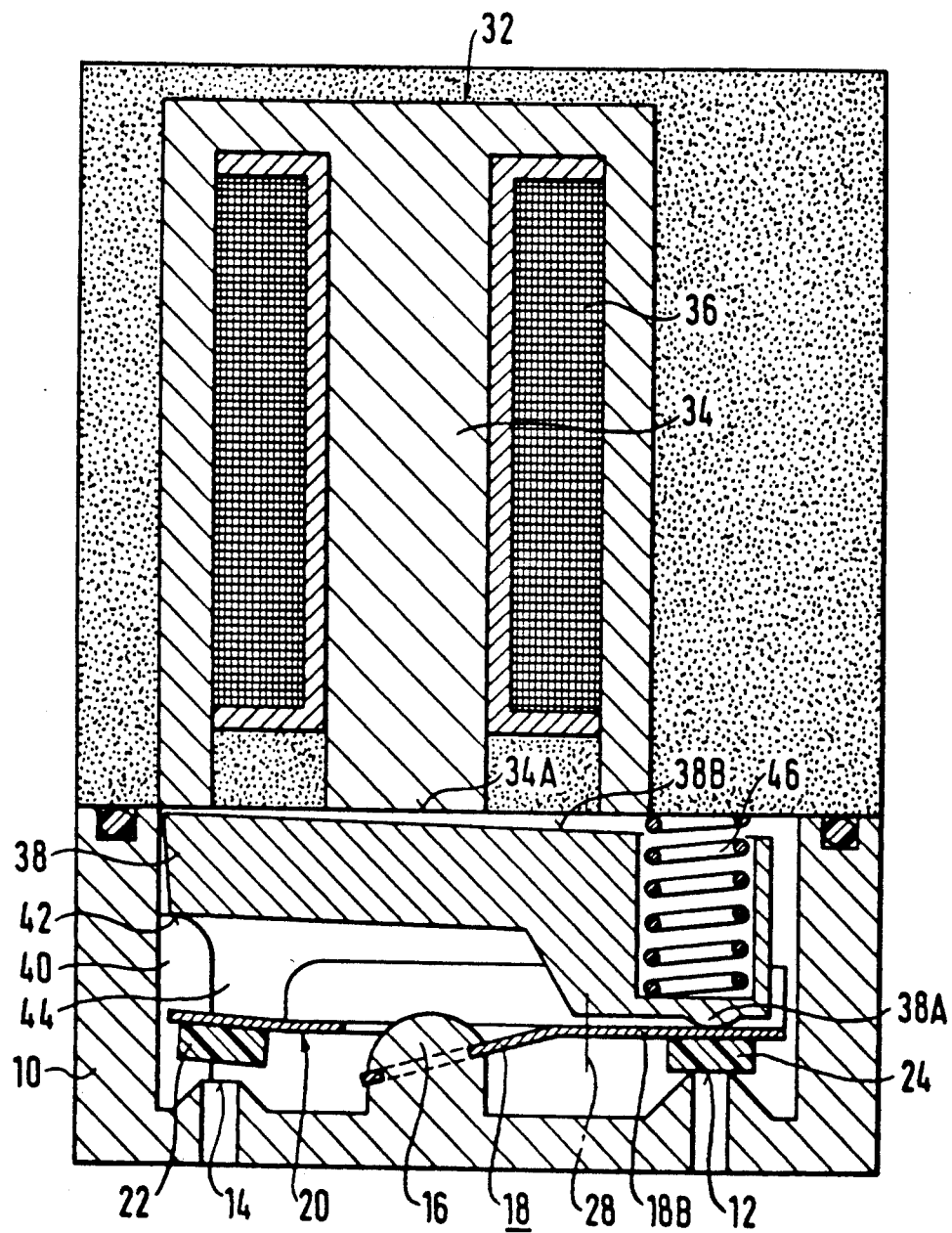
FIG. 5 is a schematic sectional view of the embodiment shown in the preceding figs., however with the drive.

In the embodiment according to FIG. 5, an electromagnet unit 32 is put onto the open end of valve chamber 10 as a drive. Electromagnet unit 32 consists of an E-shaped magnet yoke 34, a coil 36 put onto the latter's middle leg and a flap armature 38 inserted into valve chamber 10. Flap armature 38 is carried at its one end on a base 40 formed to be integral with a lateral side of valve chamber 10 and there constitutes a swivel bearing 42 just by being in contact. Flap armature 38 is included in a slot-shaped pocket 44 having clearance and belonging to valve chamber 10. The functional parts of the multi-way valve correspond to the embodiment shown in FIGS. 1 to 4 and therefore are not described anew. The end of flap armature 38 situated in the vicinity of closing body 24 is pressed against the end region of actuating member 20 in the vicinity of closing body 24 via an integrally formed pressure extension 38A through a helical spring 46 inserted into the bore of flap armature 38 in order to hold closing body 24 in tight contact with the seat surface of valve seat 12. There, actuating member 20 takes on the actuated position as shown in FIG. 4 corresponding to the neutral position of electromagnet drive 32. In this condition, a wedge-shaped opening is formed between surfaces 34A and 38A of the E-shaped magnet yoke 34 and the flap armature 38 respectively, said surfaces facing each other. If coil 36 is excited, flap armature 38 is attracted against the force exerted by helical spring 46 so that pressure extension 38A moves away from actuating member 20. Then, actuating member 20 takes on the neutral position shown in FIG. 1 wherein closing body 22 rests in sealing contact on the seat surface of valve seat 14. Pressing actuation by electromagnet drive 32 as chosen in the embodiment according to FIG. 5 is especially advantageous in that the spring tension of elastic lamella 18 acts opposite with respect to the spring tension exerted by helical spring 46 and thus supports the attractive movement of flap armature 38 in the initial stage of this attractive movement in order to further reduce the required drive power. Pressing actuation is also especially advantageous in that no form-fit or frictional connection is needed whatsoever between actuating member 20 and the drive in non-actuated condition of this actuating member (FIG. 1).

Figure 10:
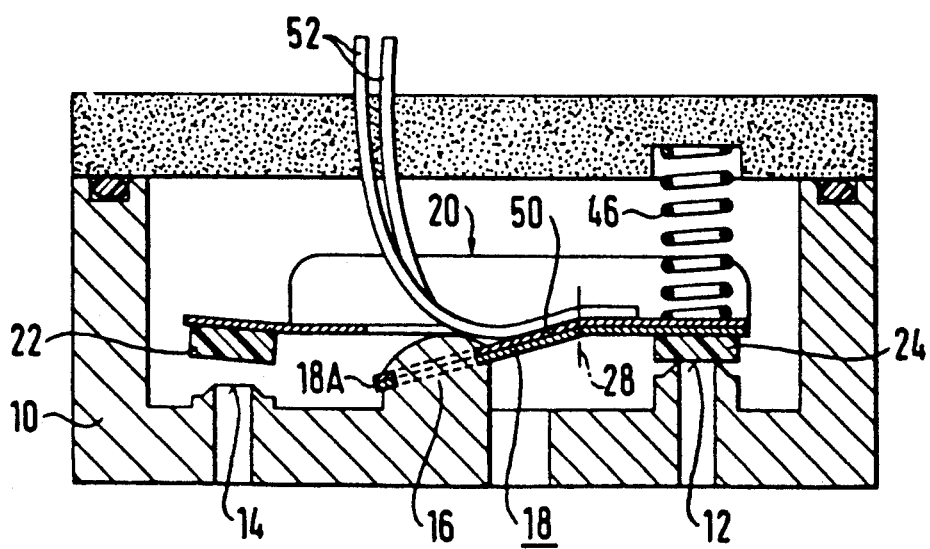
FIG. 10 shows an embodiment wherein the drive is integrated into the elastic lamella.

The functional parts according to the embodiment of FIGS. 1 to 4 are again utilized in the embodiment according to FIG. 10. However, deviating from the embodiment shown in FIG. 5, the drive is combined with elastic lamella 18. Strip 50 forming the drive of the multi-way valve is put onto elastic lamella 18. The strip 50 may be a bimetallic strip or form a bimetallic strip together with elastic lamella 18. The bimetallic element of such an embodiment is electrically heated via two lines 52 led outside. If there is current conduction, the bimetallic element is heated and changes its shape for moving actuating member 20 from its first position into the other one. In the embodiment shown in FIG. 10, the end of actuating member 20 which is situated in the vicinity of closing body 24 is applied against valve seat 12 by a helical spring 46 having its one end supported at the top of valve chamber 10 so that this valve seat is closed by closing body 24 when the bimetallic element is in neutral position. If the bimetallic element is heated, this element is deformed together with elastic lamella 18 against the action of helical spring 46 to bring closing body 22 in contact with the heat surface of valve seat 14 and to lift closing body 24 off valve seat 12.

Strip 50 may also be manufactured of a piezoelectric material which deforms under action of an applied voltage. Further, strip 50 may consist of a material which deforms in dependence upon temperature making use of memory crystallization effects.

Lift armature magnets as well as pneumatic diaphragm or piston drives ma also be considered as drives.

Figure 14:
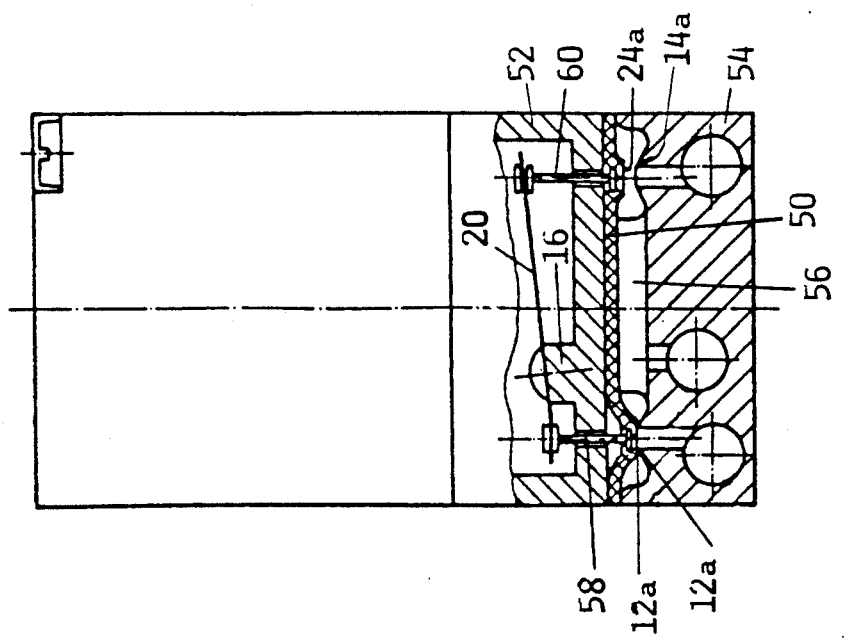
FIG. 14 is a schematic sectional view taken through the valve chamber and part of the drive side separated by a diaphragm in a further embodiment.

A further embodiment is shown in FIG. 14, which distinguishes itself in that the valve chamber does comprise almost no dead volume. Actuating member 20 is substantially formed in the same manner as described above referring to FIGS. 1 to 9 in this embodiment, however, the closing bodies are not directly attached to it. Rather, closing bodies 22a, 24a are formed at a diaphragm 50 which is gripped at its outer edge between a casing portion 52 facing the valve drive and the outer edge of a second casing portion 54 wherein valve chamber 56 is formed. In this valve chamber, the two valve seats 12a, 14a are disposed similarly as in the above-described embodiments. According to the respective valve type, they are connected to flow channels leading outwards. Thus, closing bodies 22a, 24a are not actuated directly, but indirectly via actuating member 20 which is for this purpose, at each of its ends where the closing bodies are attached to in the above-described embodiments, connected to an actuating pin 58 or 60 respectively extending through an aperture in casing portion 52 and engaging, at its end looking away from actuating member 20, diaphragm 50 or closing body 22a or 24a respectively being formed at the diaphragm. As becomes apparent from FIG. 14 each of the pins 58 or 60 respectively is provided with a head at its end connected with diaphragm 50, the head being embedded in the diaphragm.

This embodiment distinguishes itself by hermetic separation between valve drive and valve chamber so that harmful influences on valve drive parts brought about by the valve controlled medium are avoided. Moreover, no spaces are formed in the valve for the medium to be stagnant therein so that this embodiment of the valve might almost be designated as "low dead volume" valve.

Figure 15:
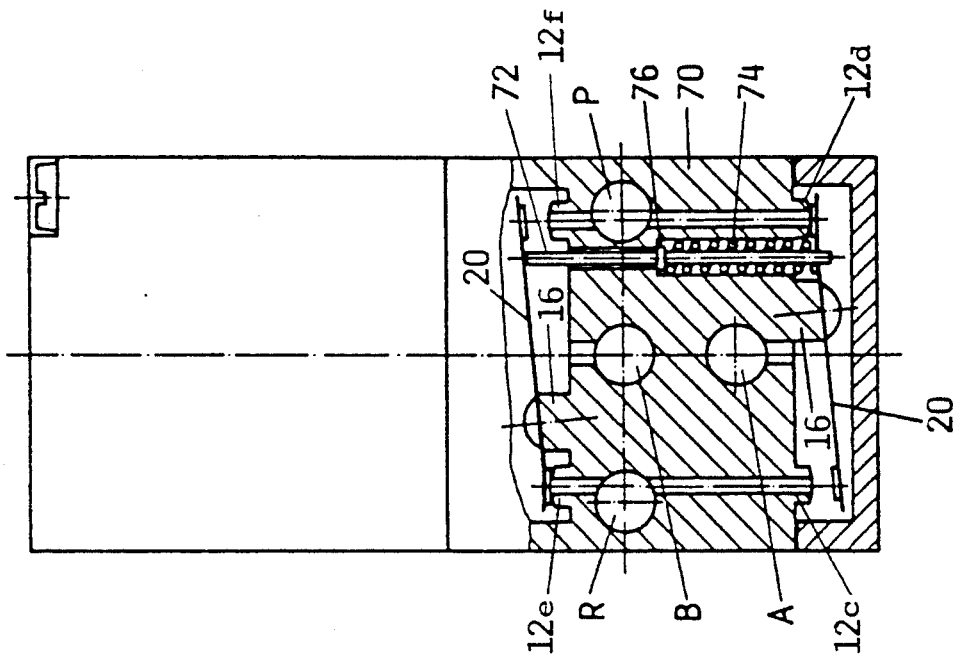
FIG. 15 is a sectional view taken through the valve chamber in a further embodiment forming a 4/2 way valve.

In the embodiment shown in FIG. 15, a 4/2 way valve is concerned wherein two actuating members 20 of the kind specified are coupled with respect to the drive unit, the members facing each other in tandem arrangement. As is apparent from FIG. 15, the arrangement of actuating members 20 is almost point-symmetric with respect to the center of an intermediate valve chamber 70 on which four valve seats 12c, 12d, 12e and 12f are formed. Each pair of valve seats 12c, 12d on the one hand and 12e, 12f on the other hand, which are arranged in the same manner as described above, has one of actuating members 20 allocated to it. While actuating member 20 situated on the valve drive side is actuated directly via the valve drive, that is via its flat armature in an embodiment of the drive according to FIG. 5, actuating member 20 is driven indirectly via a coupling device consisting of a pin 72 and a pressure spring 74. Pin 72 has its one end supported on actuating member 20 facing the valve drive. It extends through a bore of intermediate casing 70 which is proviede with a widening for taking up pressure spring 74. This pressure spring 74 has its one end supported on a shoulder 76 of pin 72 and its other end supported on actuating member 20 looking away from the valve drive. Inside the intermediate casing 70, the different flow channels may be seen whereby the valve chambers or valve seat mouths respectively are linked with the outer valve connections.

It can be seen that this embodiment may be realized very easily in spite of its complex switching functions, especially by using similar or almost similar actuating members 20 which may be used for other variants, too. One particular advantage of this embodiment consists in the fact that the different components of the valve may be combined in a kit-like manner. Thus, the drive of the embodiment shown in FIG. 14 may correspond to the one destined for the embodiment according to FIG. 15, the valve chamber together with valve seats, actuating members, closing bodies and external connections suited for the desired valve function being used respectively.

Figure 11:
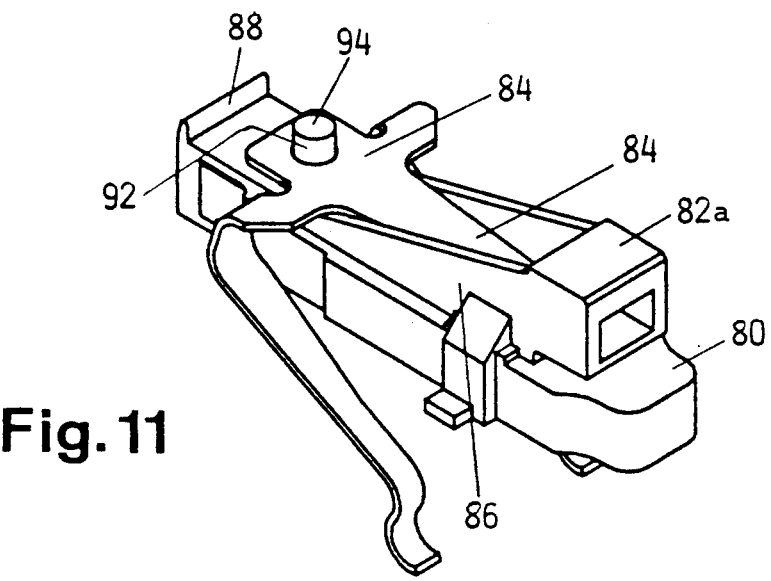
FIG. 11, 12 and 13 are perspective views of a flat armature according to one advantageous further improvement.
Figure 12:
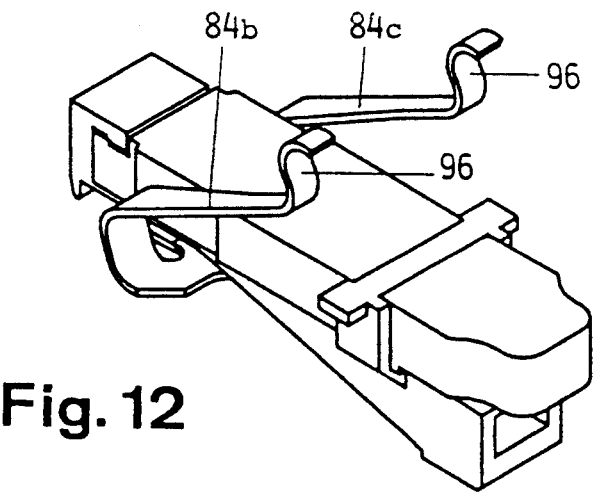
Figure 13:
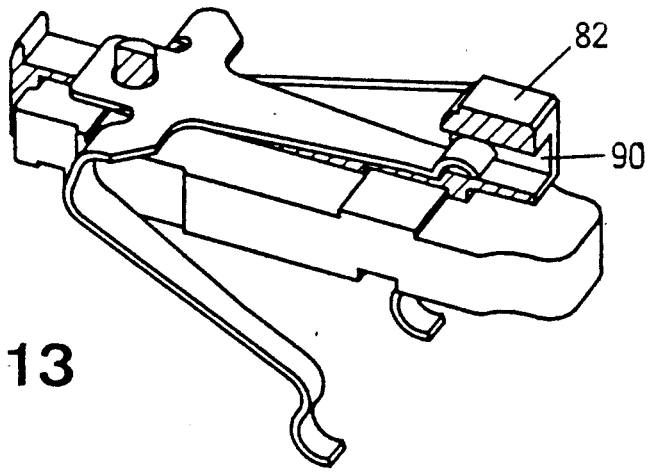

Finally, FIGS. 11, 12 and 13 show a preferred embodiment of a flat armature for an electromagnet valve drive. A flat armature of this kind may be used in the embodiments shown in FIGS. 5, 14 and 15, for example.

FIG. 11 shows the flat armature in a perspective view taken from the side of the valve seat; FIG. 12 shows the armature in a view taken from the valve drive, and FIG. 13 shows it from the same side as in FIG. 11, but with a cover shown in sectional view.

One particular feature of this embodiment consists in the fact that the flat armature generally denoted by 80 is integrally combined with a pressure transmission element 82 and a spring 84 to form one single component. This is advantageous in so far as the functional parts of the flat armature are combined so that they cannot be lost, whereby assembly problems may be avoided, and additional tolerances between the electromagnet and the actuating member are avoided. This is especially true, if the metallic flat armature is provided with a synthetic material coating 86 formed by extrusion-coating whose integral part is pressure transmission element 82, which is shown in the preferred embodiment. This coating causes the thickness tolerances of the metallic flat armatures to have no effect at all in the whole actuating member and thus causes the actuating member to comprise the narrow tolerances typical of injection molded synthetic material. On the same side as this pressure transmission element 82 and at the end of flat armature 80 opposite the transmission element, there is integrally formed a support edge 88 which engages a groove in the casing and thus facilitates precise and very low-friction support of the actuating member. Spring 84 has a middle arm 84a engaging, at one of its ends, a rectangular aperture 90 of the synthetic material coating 86 and comprising, at its other end, a circular aperture 92 allowing to put spring 84 onto a pivot 94 which is equally formed to be integral with coating 86. The pivot 94 may be additionally caulked or bonded in order to secure spring 84 at the flat armature 80.

On each of its two sides, spring 84 comprises one spring lamella 84b, 84c respectively which is first bent off from the plane of middle arm 84a and then redressed to run out into a curved support portion 96.

According to one further special feature, the coating 86 made of synthetic material is coloured, the respective colour implying information about the dimensioning of spring 84. Thus, the spring force and spring characteristic suited for the respectively desired purpose is provided by using a flat armature 80 of a specific colour.

The embodiment shown in FIGS. 11 to 13 is also advantageous in so far as the use of metal and synthetic material in a composite component facilitates favourable combinations of material for attaining minimum friction, long life, resistance against aggressive media and low switching noise.

We claim:

1. A multi-way valve comprising:
   a valve body,
   a valve chamber disposed within said valve body,
   two valve seats formed in the valve chamber and having seat surfaces which are coplanar or parallel to each other,
   two closing bodies, each cooperating with a respective valve seat and being movably mounted in said valve chamber between a closing position in engagement with the respective valve seat and an opening position distant from said valve seat, the direction of movement from said closing position and said opening position being identical for both valve bodies;
   an elongated actuating member having opposite ends to which said closing bodies are respectively attached and being tiltably mounted in said valve chamber about an axis intermediate said opposite ends; and
   a drive engaging said actuating member, wherein at least one elastic lamella is connected to the actuating member via a flexible connection defining a friction-free and guide-free tilting axis therebetween,
   said lamella having a distal end remote from said actuating member and being firmly received by a portion of said valve body disposed within said valve chamber at said distal end,
   whereby said actuating member is tiltable with respect to said portion of said valve body about said friction-free and guide-free tilting axis to bring said closing bodies alternately into their closing and opening positions, said tilting axis moving in space when said actuating member is moved to bring the closing bodies into their opening and closing positions.

2. Multi-wave valve according to claim 1, wherein the actuating member is formed to be rigid at least in the region of transition to the elastic lamella.

3. Multi-way valve according to claim 2, wherein one of the closing bodies is attached to a lamella-like slightly bent-off extension of the actuating member, and that the actuating member is formed to be rigid between this extension and its end to which the other closing body is attached.

4. Multi-way valve according to claim 2 wherein the actuating member is formed to be lamella-shaped as a whole and, at least over one portion of its longitudinal extension, is provided with a region being bent at right angles which confers rigidity to the actuating member in the corresponding region.

5. Multi-way valve according to claim 4, wherein the region bent at right angles is formed at the lateral edges of the actuating member.

6. Multi-way valve according to claim 4, wherein the region which is bent at right angles forms a rib being situated in the middle plane perpendicular with respect to the plane defined by the actuating member.

7. Multi-way valve according to claim 1 wherein the actuating member is formed to be a single piece together with the elastic lamella.

8. Multi-way valve according to claim 7, wherein the actuating member together with the elastic lamella is formed as a punched part.

9. Multi-way valve according to claim 1, wherein the elastic lamella adjoins the actuating member in the region of the latter's one end that is rigid.

10. Multi-way valve according to claim 1, wherein the fixing location of the elastic lamella is situated at the valve chamber between the two valve seats.

11. Multi-way valve according to claim 10, wherein the seat surfaces of the two valve seats are situated at different or same level, that the actuating member is formed to be at least approximately straight between its two ends and that the elastic lamella is inclined from the location of its connection situated at the actuating member in the direction of the valve seat towards the fixing location.

12. Multi-way valve according to claim 1, wherein two elastic lamellas are connected to the actuating member and extend in the longitudinal direction and at both sides of the member to be slightly spaced with respect to one fixing location at the valve chamber respectively.

13. Multi-way valve according to claim 12, wherein the two elastic lamellas form the longitudinal sides of a frame portion surrounding the integrally formed actuating member and one of its transverse sides being connected to the actuating member and the other being gripped at the valve chamber.

14. Multi-way valve according to claim 1, wherein one of the closing bodies is applied against the corresponding seat surface through the spring tension exerted by the elastic lamella.

15. Multi-way valve according to claim 14, wherein the drive engages the portion of actuating member which is situated in the vicinity of the other closing body in a pressing manner.

16. Multi-way valve according to claim 15, wherein the drive is formed by an electromagnet whose flat armature is supported with its one end region at the magnet yoke to be swivelling, said armature forming, in neutral position, a wedge-shaped slot together with the magnet yoke and pressing at its other end region against the adjoining end of the actuating member by means of spring tension via a pressure transmission element in order to keep the closing body attached to the member in contact with the associated seat surface.

17. Multi-way valve according to claim 16, wherein the flat armature is integrated together with the pressure transmission element and the spring to form a single component.

18. Multi-way valve according to claim 24, wherein the flat armature is a composite component made of magnet material and synthetic material, the synthetic material forming a coating surrounding the magnet material at least in part and being provided with elements for attaching the spring.

19. Multi-way valve according to claim 18, wherein the coating of synthetic material is to be provided with configurations for taking up the spring in frictional and/or form-fit connection.

20. Multi-way valve according to claim 17, wherein the spring comprises spring lamellas being disposed at both sides of the flat armature and a middle attachment art determined at the flat armature.

21. Multi-way valve according to claim 18, wherein the coating comprises a support edge at the end of flat armature looking away from the pressure transmission element and on the same side as of this pressure transmission element.

22. Multi-way valve according to claim 18, wherein the coating is formed by extrusion-coating.

23. Multi-way valve according to claim 18, wherein the coating is coloured in a colour implying information about the dimensioning of the spring.

24. Multi-way valve according to any of claims 1 to 6, wherein in that the drive is formed by a drive element which may be deformed under the influence of a control value and which is allocated to the elastic lamella to form a frictional connection.

25. Multi-way valve according to claim 24, wherein the drive element is formed by a bimetallic strip combined with the elastic lamella which may be heated, by a strip made of piezoelectric material or a strip of a material which may be deformed in dependence upon temperature.

26. Multi-way valve according to claim 24 wherein that one of the closing bodies is pressed against the corresponding seat surface by the force exerted by a readjusting spring which is dimensioned so as to be surmountable by the drive force of the drive element.

27. A multi-way valve comprising a valve body, a valve chamber disposed within the valve body, at least two valve seats formed in the valve with respect to each other, closing bodies associated with each of the valve seats respectively, a valve drive, as well as an actuating member disposed between the valve drive and the closing bodies, wherein the valve chamber is subdivided by a diaphragm into a first region wherein the valve chamber is situated and a second region wherein the valve drive and the actuating member are located and wherein the closing bodies are disposed at the diaphragm to be opposite the respective associated valve seat and connected to the diaphragm, each closing body connected to the actuating member via a coupling device and wherein the actuating member is formed of a spring lamella having free ends, the coupling device being connected respectively to said free ends, said actuating member being tiltably mounted in said valve chamber about a friction-free and guide-free axis via a flexible lamella section connected to said actuating member and firmly received by a portion of said valve body within said valve chamber whereby said actuating member is tiltable with respect to said portion of said valve body about said friction-free and guide-free tilting axis to bring said closing bodies alternately into their closing and opening positions.

28. Multi-way valve according to claim 27 wherein the diaphragm is gripped between two valve chamber portions at its outer edge and that one of these chamber portions contains the valve seats as well as the associated flow channels, while the other chamber portion contains the actuating member and the valve drive and is provided with apertures for the passage of the preferably pin-like coupling devices.

29. 4/2-way valve comprising a valve body and a valve chamber disposed within the valve body, four valve seats and associated closing bodies being actuated in pairs by a common valve drive, wherein said valve comprises two actuating members formed as a spring lamella, two closing bodies being respectively disposed at both ends of said actuating members, said actuating members comprising an elastic lamella section connected thereto, said lamella section having a distal end extending from said actuating members that is firmly received by a portion of the valve body within the valve chamber by means of which the actuating member is supported tiltably about a friction-free and guide-free axis to bring said closing bodies into their closing and opening positions, wherein the first of the two actuating members is disposed on the side of the valve drive and actuatable by the latter, while the second actuating member is connected to the first actuating member via a coupling device and actuatable by the latter.

30. 4/2-way valve according to claim 29, wherein the valve seats are disposed in pairs to be at least approximately point-symmetric on the two sides of a casing block facing each other in which flow channels leading to the valve seats are formed, and that the coupling device is formed by a pin which is guided to be slidable in a bore of the casing block.

31. 4/2-way valve according to claim 29, wherein the pin is supported at its one end on the first actuating member and is supported, at a pressure spring surrounding its second end and being supported on one shoulder of the pin, on the second actuating member.

* * * * *